(No Model.)
L. G. ROWAND.
AUTOMATIC TEST CIRCUIT.
No. 591,010. Patented Oct. 5, 1897.
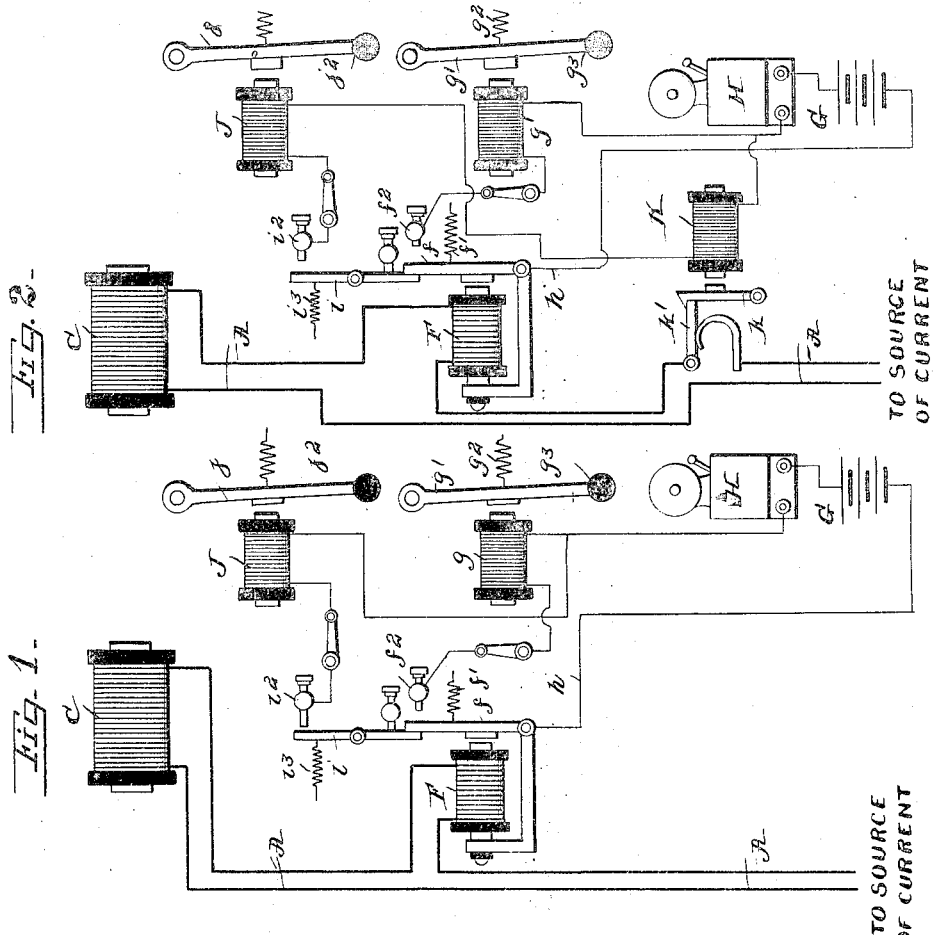
Witnesses
Inventor.
Attorney.

UNITED STATES PATENT OFFICE.

LEWIS G. ROWAND, OF CAMDEN, NEW JERSEY.

AUTOMATIC TEST-CIRCUIT.

SPECIFICATION forming part of Letters Patent No. 591,010, dated October 5, 1897.

Application filed December 22, 1896. Serial No. 616,672. (No model.)

*To all whom it may concern:*

Be it known that I, LEWIS G. ROWAND, a citizen of the United States, residing at Camden, county of Camden, and State of New Jersey, have invented a new and useful Improvement in Automatic Electric - Circuit Testers, of which the following is a full, clear, and exact description, reference being had to the accompanying drawings, which form a part of this specification.

My invention has for its object to provide means whereby an indication is given if the circuit be broken or too heavily charged, and in the latter case an arrangement is made whereby under those conditions the circuit will be automatically broken.

I will first describe my invention as illustrated in the drawings and then point out the invention in the claim.

In the drawings, Figures 1 and 2 are electric diagrams.

Speaking first of the construction shown in Fig. 1, A represents the main circuit. This circuit has upon it the translating device C, which in this case is shown as an electromagnet.

F is an electromagnet having the pivoted armature $f$.

G is a local battery at the point desired for indication. The circuit $h$ from this battery G passes through the armature $f$. This armature $f$ has connected to it the spring $f'$, which is of sufficient strength to hold the armature against the binding-post $f^2$ when the magnet F is not energized. From the binding-post $f^2$ this circuit leads to the magnet $g$, the armature $g'$ of which is pivoted and normally retracted by spring $g^2$. This armature $g'$ controls the indicator $g^3$. Finally, the magnet of bell H is also in the circuit.

The operation is as follows: When the current is passing through the circuit A, the magnet F, acting on the armature $f$, holds the circuit $h$ open; but if the circuit A is broken current will no longer pass, and the magnet F will cease to be energized, and the spring acting upon the armature $f$ will close the circuit $h$, thus energizing magnet $g$, carrying its armature $g'$, to operate the indicator. The bell H will also ring.

In the construction shown in Fig. 1 provision is made for indicating when the line becomes too heavily charged as well as when broken. In this construction the secondary circuit $h$ is divided at armature $f$, one branch passing to binding-post $f^2$, thence to magnet $g$ and magnet of bell H. The other branch passes to the secondary armature $i$, the binding-post $i^2$, (from which the armature $i$ is held by spring $i^3$,) thence from post $i^2$ to magnet J, the armature $j$ of which controls the signal $j^2$. From magnet J it connects with the wire leading from magnet $g$ to magnet of bell H. The spring controlling the armatures $f$ and $i$ is of such strength that with normal current passing over line A the armature $f$ will be held from contact with the binding-post $f^2$; but to prevent the armature $i$ from coming in contact with binding-post $i^2$, if the current in the line A increases abnormally, the armature $i$ will be brought in contact with binding-post $i^2$ and a circuit including battery G, magnet J, and bell H is formed, and a signal is given and the bell rings.

In Fig. 2, in addition to what is shown in Fig. 1, means are provided for breaking the line-circuit A when charged with too heavy currents. In this construction in the circuit between the magnet J and bell H is inserted an electromagnet K, the armature $k$ of which controls a switch $k'$ on the main circuit A. When the circuit including this magnet is completed, the magnet becomes energized and opens the main circuit.

The switch D, Fig. 1, enables a test to be made at any time of the strength of current in line A. By moving the switch D from contacts $d$ $d^2$ to $d'$ $d^3$ the meter E is thrown into the circuit A and the current strength can be measured.

Having now fully described my invention, what I claim, and desire to protect by Letters Patent, is—

A main circuit, a secondary circuit having a source of current-supply independent of the main circuit's supply, said secondary circuit having separate branches, indicating devices in each branch and a switch in each branch, the switch of one branch being provided with a device tending to keep it closed, and the switch of the other branch with a device tending to keep it open, an electromagnet acting when energized against both said devices.

In testimony of which invention I have hereunto set my hand.

LEWIS G. ROWAND.

Witnesses:
CAROL H. DESHONG,
M. F. ELLIS.